(12) United States Patent
Astrike

(10) Patent No.: US 10,994,671 B2
(45) Date of Patent: May 4, 2021

(54) OVERHEAD CONSOLE WIRE BRACKETS FOR WIRE MANAGEMENT

(71) Applicant: Toyota Motor Engineering & Manufacturing North America, Inc., Plano, TX (US)

(72) Inventor: Logan R. Astrike, Dexter, MI (US)

(73) Assignee: Toyota Motor Engineering & Manufacturing North America, Inc., Plano, TX (US)

(*) Notice: Subject to any disclaimer, the term of this patent is extended or adjusted under 35 U.S.C. 154(b) by 59 days.

(21) Appl. No.: 16/451,758

(22) Filed: Jun. 25, 2019

(65) Prior Publication Data
US 2020/0406836 A1   Dec. 31, 2020

(51) Int. Cl.
| | | |
|---|---|---|
| *B60R 13/02* | (2006.01) | |
| *B60R 16/02* | (2006.01) | |
| *H02G 1/08* | (2006.01) | |
| *H02G 3/22* | (2006.01) | |
| *H02G 3/04* | (2006.01) | |

(52) U.S. Cl.
CPC .......... *B60R 13/0212* (2013.01); *B60R 13/02* (2013.01); *B60R 16/0215* (2013.01); *H02G 1/08* (2013.01); *H02G 3/0406* (2013.01); *H02G 3/22* (2013.01); *B60R 2013/0287* (2013.01)

(58) Field of Classification Search
CPC ............ B60R 13/0212; B60R 16/0215; H02G 3/0406; H02G 3/22
USPC ................................................. 296/214, 37.8
See application file for complete search history.

(56) References Cited

U.S. PATENT DOCUMENTS

| | | | |
|---|---|---|---|
| 5,106,143 A * | 4/1992 | Soeters .................... | B60R 7/04 296/37.8 |
| 5,887,939 A | 3/1999 | Yamaguchi et al. | |
| 7,413,236 B2 | 8/2008 | Licher et al. | |
| 9,067,545 B2 | 6/2015 | Cham et al. | |
| 2001/0005083 A1* | 6/2001 | Serizawa ............ | B60R 16/0207 296/37.8 |
| 2010/0294563 A1* | 11/2010 | Yamashita .......... | B60R 16/0215 174/72 A |

(Continued)

FOREIGN PATENT DOCUMENTS

| | | | |
|---|---|---|---|
| DE | 19730963 | * | 1/1999 |
| DE | 19730963 A1 | | 1/1999 |

(Continued)

OTHER PUBLICATIONS

SMT Cable Clips, https://www.harwin.com/product-highlights/smt-cable-clips/, Apr. 24, 2019.

(Continued)

*Primary Examiner* — Dennis H Pedder
(74) *Attorney, Agent, or Firm* — Dinsmore & Shohl LLP

(57) ABSTRACT

A vehicle includes a roof assembly including a roof panel. A headliner is located interior of the roof panel. An overhead console assembly is connected to the headliner. An overhead console wire bracket includes a longitudinal portion that extends in a vehicle longitudinal direction from the overhead console assembly toward a front edge of the headliner and a lateral portion that extends from the longitudinal portion in a vehicle lateral direction. The lateral portion engages a wire that extends over the front edge of the headliner.

13 Claims, 4 Drawing Sheets

(56) References Cited

U.S. PATENT DOCUMENTS

2019/0100149 A1    4/2019   Stakoe et al.

FOREIGN PATENT DOCUMENTS

| DE | 29821884 | * | 5/2000 |
| EP | 0813277  | * | 4/1987 |

OTHER PUBLICATIONS

How to Install Overhead Console in 1st Gen Explorer—updated, (https://www.explorerforum.com/forums/index.php?threads/how-to-install-overhead-console-in-1st-gen-explorer-updated.244254/), May 9, 2009.

* cited by examiner

OVERHEAD CONSOLE WIRE BRACKETS FOR WIRE MANAGEMENT

TECHNICAL FIELD

The present specification generally relates to wire management, and more specifically, overhead console wire brackets for wire management and methods of using overhead console wire brackets.

BACKGROUND

A headliner is a panel that covers a roof of a vehicle. Headliners may be formed of layers of material and may include a fabric on an interior facing side to provide a soft touch. Headliners are typically affixed to a roof panel that is overhead from inside the vehicle. In many vehicles, it is not uncommon to run electrical wires between the headliners and roof panels. As the number of wires increases, it becomes increasingly difficult to manage those wires.

Accordingly, a need exists for overhead console wire brackets for wire management and methods of using overhead console wire brackets for wire management.

SUMMARY

In one embodiment, a vehicle includes a roof assembly including a roof panel. A headliner is located interior of the roof panel. An overhead console assembly is connected to the headliner. An overhead console wire bracket includes a longitudinal portion that extends in a vehicle longitudinal direction from the overhead console assembly toward a front edge of the headliner and a lateral portion that extends from the longitudinal portion in a vehicle lateral direction. The lateral portion engages a wire that extends over the front edge of the headliner.

In another embodiment, a method of installing a wire onto a headliner of a vehicle is provided. The method includes running a wire along the headliner in a vehicle longitudinal direction toward a front edge of the headliner. The wire is located adjacent to an overhead console wire bracket including a longitudinal portion that extends in the vehicle longitudinal direction from at least part of an overhead console assembly toward the front edge of the headliner and a lateral portion that extends from the longitudinal portion in a vehicle lateral direction. The wire is located between the lateral portion of the overhead console wire bracket and the front edge of the headliner.

These and additional features provided by the embodiments described herein will be more fully understood in view of the following detailed description, in conjunction with the drawings.

BRIEF DESCRIPTION OF THE DRAWINGS

The embodiments set forth in the drawings are illustrative and exemplary in nature and not intended to limit the subject matter defined by the claims. The following detailed description of the illustrative embodiments can be understood when read in conjunction with the following drawings, where like structure is indicated with like reference numerals and in which:

DETAILED DESCRIPTION

Vehicles according to the present specification include overhead console wire brackets for wire management. The overhead console wire brackets extend outwardly from an overhead console assembly toward an edge of a headliner where the wires are located. The overhead console wire brackets include a longitudinal portion extending in a vehicle lengthwise direction toward the edge of the headliner and a lateral portion extending in a vehicle widthwise direction that is used to capture the wires between the headliner and the lateral portion of the overhead console wire brackets. In some embodiments, the edge of the headliner has notches cut into headliner, which serve to receive and hold the wires therein. The lateral portion of the overhead brackets can close off and open side of these notches, which inhibits removal of the wires from the notches. As used herein, the term "wire" is meant to include single or multiple conductors wrapped in one or multiple jackets with one or more wires within a single jacket. As such, as used herein, a "cable" is a type of "wire."

Figure 1:
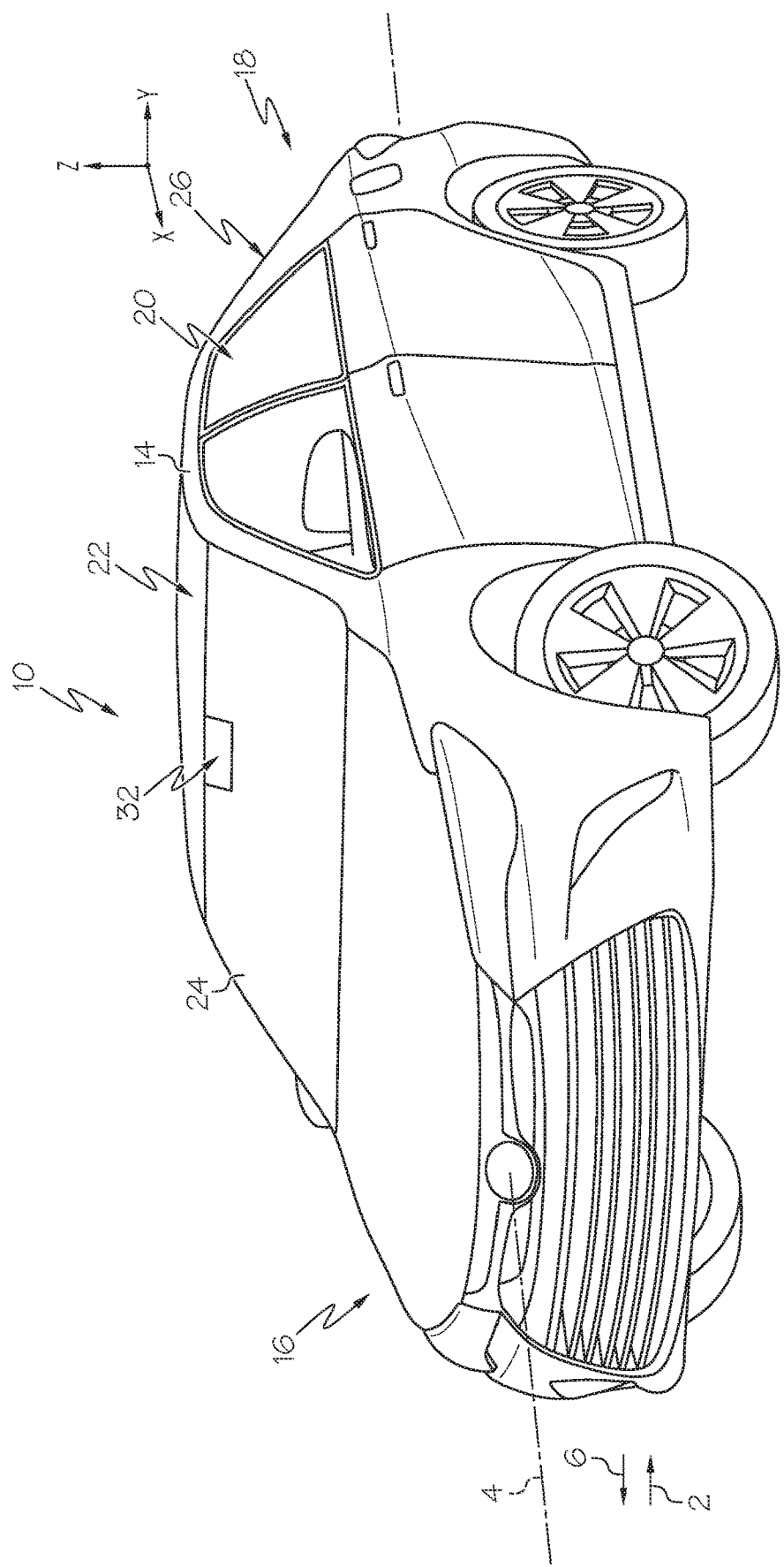
FIG. 1 illustrates a perspective view of a vehicle, according to one or more embodiments shown and described herein.

As used herein, the term "vehicle longitudinal direction" refers to the forward-rearward direction of the vehicle (i.e., in the +/− vehicle X-direction depicted in FIG. 1). The term "vehicle lateral direction" refers to the cross-vehicle direction (i.e., in the +/− vehicle Y-direction depicted in FIG. 1), and is transverse to the vehicle longitudinal direction. The term "vehicle vertical direction" refers to the upward-downward direction of the vehicle (i.e., in the +/− vehicle Z-direction depicted in FIG. 1). Further, the terms "inboard," "inward," "outboard" and "outward" are used to describe the relative positioning of various components of the vehicle. Referring to FIG. 1, the terms "outboard" or "outward" as used herein refers to the relative location of a component in direction 2 with respect to a vehicle centerline 4. The term "inboard" or "inward" as used herein refers to the relative location of a component in direction 6 with respect to the vehicle centerline 4. Because the vehicle structures may be generally symmetrical about the vehicle centerline 4, the direction to which use of terms "inboard," "inward," "outboard" and "outward" refer may be mirrored about the vehicle centerline 4 when evaluating components positioned along opposite sides of the vehicle 10.

The vehicle 10 may include a body framework 14 and have a front 16, a rear 18 and sides 20 that extend between the front 16 and the rear 18. A roof assembly 22 of the vehicle 10 extends between the sides 20 and between a front windshield 24 and a rear window 26. A headliner 30 (FIG. 2) is located interior to an exterior panel 34.

The vehicle 10 may include a sensor system that may include, for example, a number of sensors including a camera to automatically control vehicle systems and provide feedback to occupants. The sensors or at least some of the sensors may be housed in a unit 32 (e.g., a housing, a rearview mirror, etc.) that is located at a top of the windshield 24 near the headliner 30. Wires may run between the headliner 30 and the roof assembly 22 to provide power and transfer electrical signals to and from the sensors, while remaining largely hidden from view. As will be described in greater detail below, one or more overhead console wire brackets extend outwardly from an overhead console assembly toward an edge of the headliner 30 where the wires are located.

Figure 2:
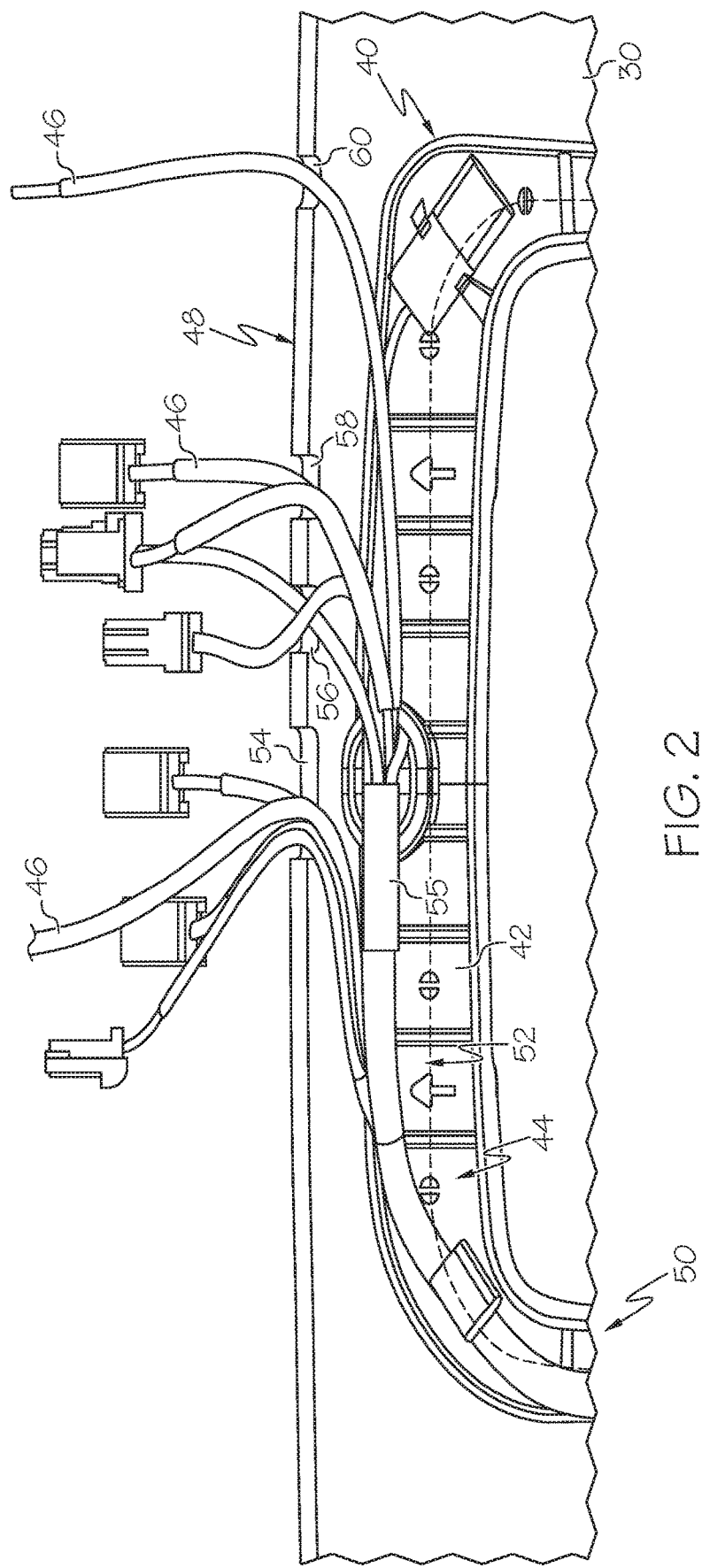
FIG. 2 is a top view of a headliner including a plurality of wires running along the headliner, according to one or more embodiments shown and described herein.

Referring to FIG. 2, an overhead console assembly, referenced generally by element 40, may include an overhead console mounting bracket 42 that is used to mount the overhead console assembly 40 to the headliner 30 and roof assembly 22. In some embodiments, an interior space 44 of the overhead console mounting bracket 42 may provide at least part of a pathway along which a plurality of wires 46 extend toward a front edge 48 of the headliner 30. The wires 46 may extend in the vehicle longitudinal direction along a longitudinal portion 50 of the overhead console mounting bracket 42 and in the vehicle lateral direction along a lateral portion 52 of the overhead console mounting bracket 42.

At the lateral portion 52 of the overhead console mounting bracket 42, the wires 46 may exit a wire harness 55 and again travel in the vehicle longitudinal direction toward the front edge 48 of the headliner 30. The front edge 48 may have notches 54, 56, 58 and 60 that are formed (e.g., cut) into a central portion of the front edge 48 that corresponds to a location of the unit 32 that houses the various sensors described above with reference to FIG. 1 and other electrical components. The wires 46 may be placed within the notches 54, 56, 58 and 60, which are recessed portion of the front edge 48 in order to inhibit their movement.

Figure 3:
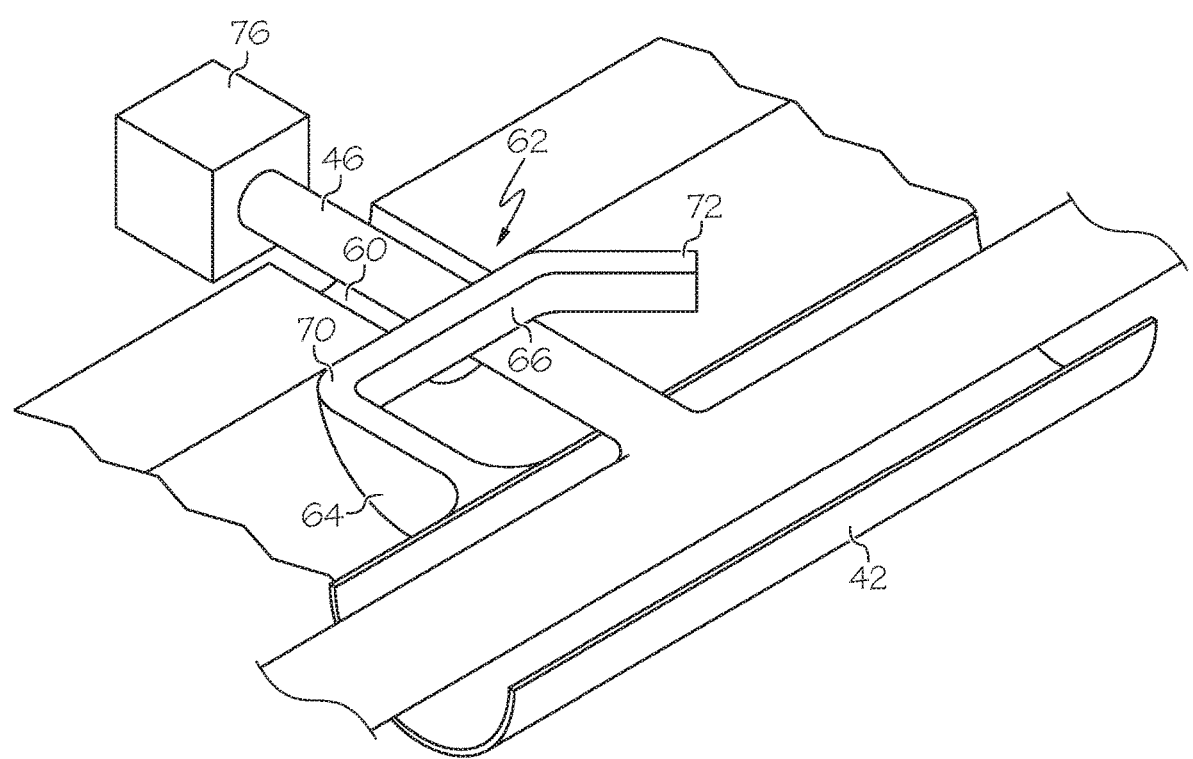
FIG. 3 is a diagrammatic perspective view of an overhead console wire bracket, according to one or more embodiments shown and described herein.

Referring to FIG. 3, the wires 46 may be held within the notches 54, 56, 58 and 60 using overhead console wire brackets 62. While only one overhead console wire bracket is illustrated by FIG. 3, each notch 54, 56, 58 and 60 may have an overhead console wire bracket 62. The overhead console wire bracket 62 may include a longitudinal portion 64 extending in the vehicle lengthwise direction toward the front edge 48 of the headliner 30 and a lateral portion 66 extending in the vehicle widthwise direction. In some embodiments, the longitudinal portion 64 may be formed integrally as a monolithic part with the overhead console mounting bracket 42 or another part of the overhead console assembly 40 (e.g., during a molding process). In other embodiments, the overhead console wire bracket 62 may be formed separately from the overhead console assembly and then connected thereto, such as using adhesive or welding.

The overhead console wire bracket 62 includes the lateral portion 66 that is connected to the longitudinal portion 64 at a bend 70. The lateral portion 66 may generally extend in the vehicle lateral direction from the bend 70 to a wire catch portion 72 that extends rearward back toward the overhead console mounting bracket 42 at an oblique angle to the lateral portion 66. The longitudinal portion 64, lateral portion 66 and wire catch portion 72 may be formed as a single, monolithic part from a same material.

The lateral portion 66 has a length that is selected to span an entire width of the notch 60. The lateral portion 66 provides a barrier that inhibits removal of the wire 46 from the notch 60. In some embodiments, the longitudinal portion 64 has a length that causes the lateral portion 66 to abut and contact the headliner 30 at the notch 60 without extending into the notch 60. The wire 46 may then be connected to an electrical component 76 on a side of the notch 60 that is opposite the overhead console mounting bracket 42.

Figure 4A:
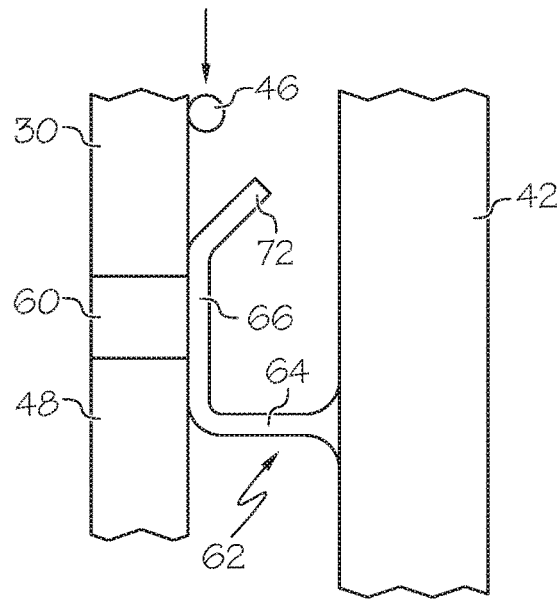
FIG. 4A illustrates a method of wire installation using the overhead console wire bracket of FIG. 3, according to one or more embodiments shown and described herein.
Figure 4B:
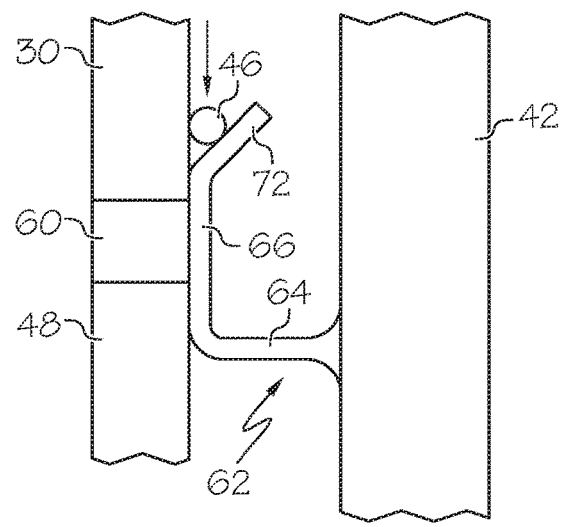
FIG. 4B illustrates the method of wire installation using the overhead console wire bracket of FIG. 3, according to one or more embodiments shown and described herein.
Figure 4C:
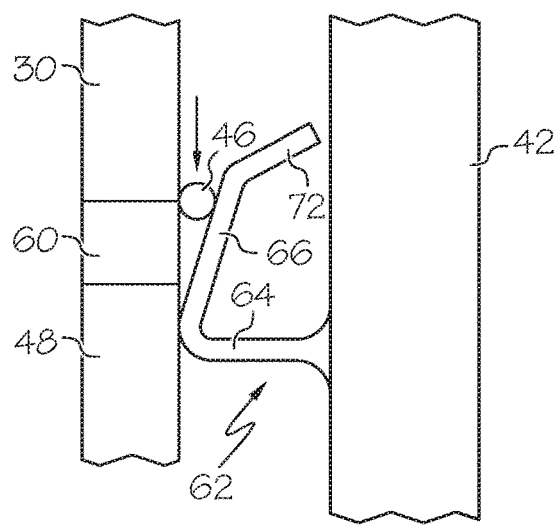
FIG. 4C illustrates the method of wire installation using the overhead console wire bracket of FIG. 3, according to one or more embodiments shown and described herein.
Figure 4D:
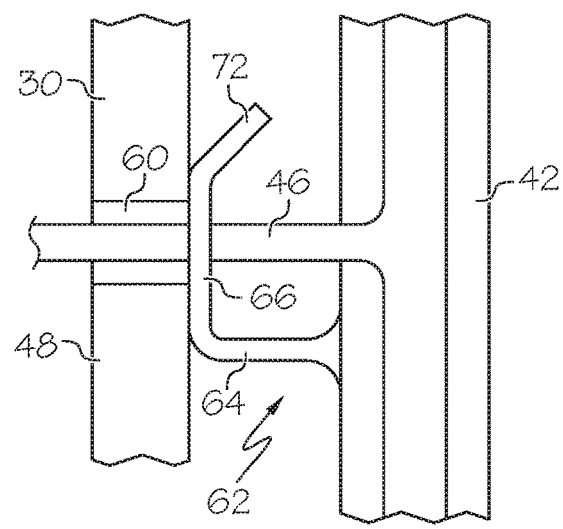
FIG. 4D illustrates the method of wire installation using the overhead console wire bracket of FIG. 3, according to one or more embodiments shown and described herein.

FIGS. 4A-4D are schematic, plan views of operation of the overhead console wire bracket 62. As described above, the overhead console wire bracket 62 includes the longitudinal portion 64 and the lateral portion 66 that extends to the wire catch portion 72. Referring to FIGS. 4A and 4B, the wire 46 may be placed in a somewhat vertical orientation at an end being placed through the notch 60 and be moved into engagement with the wire catch portion 72. The wire catch portion 72 is angled relative to the lateral portion 66, which creates a ramp surface that causes the lateral portion 66 to flex in the vehicle longitudinal direction at the bend 70. Because the overhead console wire bracket 62 may be formed of a resilient material, the lateral portion 66 may hold the wire 46 against the headliner 30 and force the wire 46 into the notch 60 as shown by FIGS. 4C and 4D. The wire 46 may then be connected to an electrical component with the lateral portion 66 providing a barrier that inhibits movement of the wire 46 out of the notch 60.

The above-described overhead console wire brackets may be provided on or formed with the overhead console assemblies that hold the wires in place after headliner installation. The L-shaped overhead console wire brackets hold the wires in the notches by creating a barrier to migration of the wires out of the notches. The overhead console wire brackets may have the wire catch portions, which are lead in features that are used to facilitate placement of the wires into the notches. The wire catch portions cause movement of the lateral portions out of the way of the notches as the wires are moved into the slots. The overhead console wire brackets may be formed of resilient material which cause the lateral portions to spring back into place once the wires are placed into the notches. The lateral portions may also have lengths that span the entire width of the notches so that gaps are not left through which the wires may move through.

It is noted that the terms "substantially" and "about" may be utilized herein to represent the inherent degree of uncertainty that may be attributed to any quantitative comparison, value, measurement, or other representation. These terms are also utilized herein to represent the degree by which a quantitative representation may vary from a stated reference without resulting in a change in the basic function of the subject matter at issue.

While particular embodiments have been illustrated and described herein, it should be understood that various other changes and modifications may be made without departing from the spirit and scope of the claimed subject matter. Moreover, although various aspects of the claimed subject matter have been described herein, such aspects need not be utilized in combination. It is therefore intended that the appended claims cover all such changes and modifications that are within the scope of the claimed subject matter.

What is claimed is:

1. A vehicle comprising:
   a roof assembly comprising a roof panel;
   a headliner located interior of the roof panel;
   an overhead console assembly connected to the headliner; and
   an overhead console wire bracket comprising a longitudinal portion that extends in a vehicle longitudinal direction from the overhead console assembly toward a notch in a front edge of the headliner and a lateral portion that extends from the longitudinal portion in a vehicle lateral direction alongside the notch thereby pinning a wire that extends over the front edge of the headliner in the notch.

2. The vehicle of claim 1, wherein the lateral portion engages the front edge and spans a width of the notch thereby pinning the wire therein.

3. The vehicle of claim 1, wherein the overhead console wire bracket is formed as part of an overhead console mounting bracket.

4. The vehicle of claim 1, wherein the lateral portion is connected to the longitudinal portion at a bend.

5. The vehicle of claim 1, wherein the lateral portion extends in the vehicle lateral direction to a wire catch portion that extends at an oblique angle to the lateral portion.

6. The vehicle of claim 5, wherein the wire catch portion extends from the lateral portion in a direction toward the overhead console assembly.

7. A method of installing a wire onto a headliner of a vehicle, the method comprising:

running a wire along the headliner in a vehicle longitudinal direction toward a notch in a front edge of the headliner;

locating the wire adjacent to an overhead console wire bracket comprising a longitudinal portion that extends in the vehicle longitudinal direction from at least part of an overhead console assembly toward the notch in the front edge of the headliner and a lateral portion that extends from the longitudinal portion in a vehicle lateral direction alongside the notch; and pinning the wire in the notch using the lateral portion that extends alongside the notch and engages the front edge of the headliner.

8. The method of claim 7, wherein the lateral portion spans a width of the notch to hold the wire therein.

9. The method of claim 7, wherein the overhead console wire bracket is formed as part of an overhead console mounting bracket.

10. The method of claim 7, wherein the lateral portion is connected to the longitudinal portion at a bend.

11. The method of claim 7, wherein the lateral portion extends in the vehicle lateral direction to a wire catch portion that extends at an oblique angle to the lateral portion.

12. The method of claim 11, wherein the wire catch portion extends from the lateral portion in a direction toward the at least part of the overhead console assembly.

13. The method of claim 7 further comprising moving the lateral portion relative to the longitudinal portion using the wire as the wire is located between the lateral portion of the overhead console wire bracket and the front edge of the headliner.

* * * * *